(No Model.)

W. J. BOGARD.
DEVICE FOR DEHORNING CATTLE.

No. 415,995. Patented Nov. 26, 1889.

Witnesses:

Inventor
William J. Bogard.
By his Attorneys,

UNITED STATES PATENT OFFICE.

WILLIAM J. BOGARD, OF MENDON, MISSOURI.

DEVICE FOR DEHORNING CATTLE.

SPECIFICATION forming part of Letters Patent No. 415,995, dated November 26, 1889.

Application filed June 25, 1889. Serial No. 315,504. (No model.)

*To all whom it may concern:*

Be it known that I, WILLIAM J. BOGARD, a citizen of the United States, residing at Mendon, in the county of Chariton and State of Missouri, have invented a new and useful Device for Dehorning Cattle, of which the following is a specification.

This invention has relation to devices for dehorning cattle; and among the objects in view are to provide a device of the class described adapted to readily take over the horn of the cattle and to quickly, smoothly, and evenly sever the horn from the head.

The invention consists in the provision of a shear-like device that is formed of opposite pivoted arms, the rear ends of which terminate in handles and the forward ends are curved and each provided with a circular horn-embracing saw-plate, whereby said saws may be opened to receive the horn, closed against the same, and be oscillated or partially rotated back and forth, thus serving to sever the horn smoothly from the animal's head.

Figure 1:
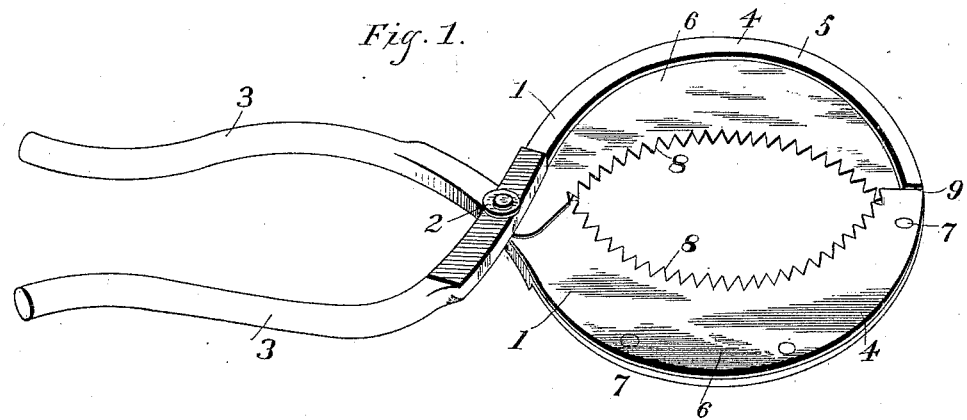
Figure 2:
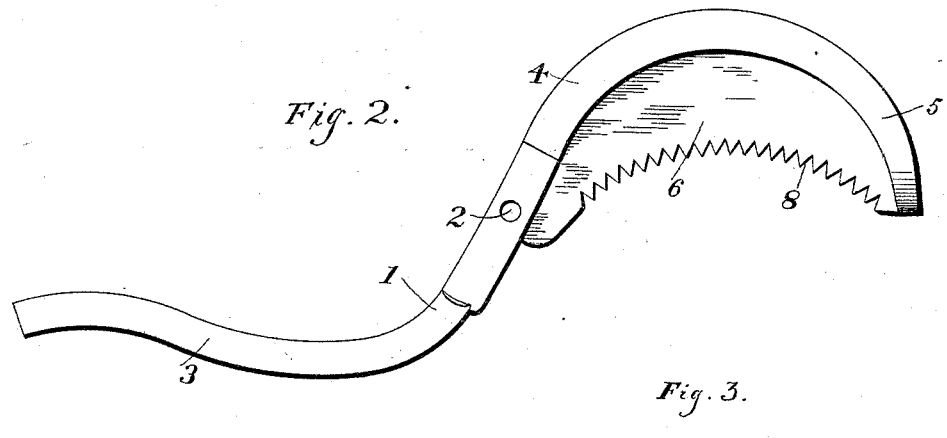
Figure 3:
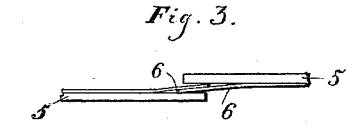

Referring to the drawings, Figure 1 is a perspective of a dehorner constructed in accordance with my invention. Fig. 2 is a plan of one of the sections detached. Fig. 3 is a front view with the sections closed.

Like numerals of reference indicate like parts in all the figures of the drawings.

1 represents the opposite sections, which are pivoted together, as at 2, and curved and extended to the rear to form handles 3. Forward of their pivot the sections are curved in a semicircular manner, forming curved arms 4, said arms terminating (by reason of one section being pivoted upon the other) out of line with each other.

Upon the inner faces of each of the curved arms are mounted curved plates 6, secured to said arms by means of rivets 7, and having their inner adjacent curved edges provided with a series of saw-teeth 8, said plates being of a length to extend from the outer ends of the arms beyond the pivotal point thereof, and through the same the pivot 2 of the sections passes, thus acting as an additional means for securing the saw-plates in position. By opening the sections the saw plates or blades are likewise spread and inserted over the horn of the animal, and are then closed by a retrograde movement of the handles.

In closing, the front opposite faces of the curved arms 5 pass each other slightly, and each saw-plate at its front terminal is slightly flared or bent outwardly from its respective arm, as at 9, so that in the act of closing the arms 5 the saw-plate of one arm will take intermediate the saw-plate of the opposite arm, and thus form a rigid unyielding saw-edge. When the device is thus closed, the animal's horn is grasped by one hand and the device oscillated or partially rotated back and forth upon the horn, and the opposite saw-teeth quickly and evenly sever the horn from the head.

Having thus described my invention, what I claim is—

1. The herein-described cutter, consisting of opposite sections pivoted intermediate their ends and provided with opposite curved saw-plates beyond their pivots and extended in rear of their pivots to form handles, substantially as specified.

2. The herein-described dehorner, consisting of opposite sections pivoted intermediate their ends and extended to the rear of their pivots to form handles and forward thereof to form opposite semicircular arms, curved saw-plates mounted on the arms and secured by rivets thereto, and having their ends bent outwardly from their respective arms and adapted to take between the opposite plate and arm and form a rigid connection, substantially as specified.

In testimony that I claim the foregoing as my own I have hereto affixed my signature in presence of two witnesses.

WILLIAM J. BOGARD.

Witnesses:
JNO. H. PARKER,
WM. MARTIN.